(12) United States Patent
Burtscher

(10) Patent No.: US 8,943,590 B2
(45) Date of Patent: Jan. 27, 2015

(54) CONCURRENT AND DELAYED PROCESSING OF MALWARE WITH REDUCED I/O INTERFERENCE

(75) Inventor: Michael Burtscher, Broomfield, CO (US)

(73) Assignee: Webroot Inc., Broomfield, CO (US)

( * ) Notice: Subject to any disclaimer, the term of this patent is extended or adjusted under 35 U.S.C. 154(b) by 807 days.

(21) Appl. No.: 12/731,537

(22) Filed: Mar. 25, 2010

(65) Prior Publication Data

US 2011/0239298 A1    Sep. 29, 2011

(51) Int. Cl.
*G06F 11/00* (2006.01)
*G06F 21/00* (2013.01)
*G06F 21/56* (2013.01)

(52) U.S. Cl.
CPC ............................... *G06F 21/564* (2013.01)
USPC ............... 726/23; 726/22; 726/24; 726/25

(58) Field of Classification Search
CPC ....... H04L 63/20; H04L 63/104; H04L 63/16; H04L 63/0227; H04L 63/0209; H04L 63/145; H04L 63/1441; H04L 63/08; H04L 63/10; H04L 63/1433; H04L 29/14; H04L 63/0272; H04L 63/0861; H04L 63/101; H04L 67/1007; H04L 67/1002; H04L 67/136; G06F 17/30165; G06F 21/10; G06F 17/3019; G06F 21/564; G06F 21/565; G06F 21/562; G06F 21/566; G06F 21/53; G06F 21/56; G06F 21/552; G06F 2221/2115; G06F 9/5001; G06F 21/577; G06F 17/30067; G06F 17/30; G06F 21/44

USPC ................. 726/23, 24; 713/187–189, 194
See application file for complete search history.

(56) References Cited

U.S. PATENT DOCUMENTS

| 7,340,774 | B2 * | 3/2008 | Hursey et al. ................... 726/22 |
| 7,590,813 | B1 * | 9/2009 | Szor ............................. 711/163 |
| 7,765,410 | B2 * | 7/2010 | Costea et al. ................. 713/188 |
| 7,845,008 | B2 * | 11/2010 | Waltermann et al. ........... 726/24 |
| 8,392,989 | B2 * | 3/2013 | Upadhyay ...................... 726/22 |

OTHER PUBLICATIONS

Microsoft Windows, I/O Prioritization in Windows Vista, May 10, 2006.*

* cited by examiner

*Primary Examiner* — Michael Chao
*Assistant Examiner* — Shu Chun Gao
(74) *Attorney, Agent, or Firm* — Merchant & Gould P.C.

(57) ABSTRACT

Systems, methods and non-transitory, tangible computer readable storage mediums encoded with processor readable instructions to scan files for malware are disclosed. An exemplary method includes writing, via a communication pathway, a first file to a storage medium that is utilized by the computer, requesting access to the first file so as to enable the first file to be scanned for malware, and delaying, when the first file resides on the storage medium, access to the first file while there is at least one I/O operation relative to the storage medium that has a higher priority level than a priority level of the request to access the first file. In addition, except to enable the first file to be scanned for malware, access to the first file is prevented until the first file has been scanned for malware.

18 Claims, 3 Drawing Sheets

CONCURRENT AND DELAYED PROCESSING OF MALWARE WITH REDUCED I/O INTERFERENCE

COPYRIGHT

A portion of the disclosure of this patent document contains material that is subject to copyright protection. The copyright owner has no objection to the facsimile reproduction by anyone of the patent disclosure, as it appears in the Patent and Trademark Office patent files or records, but otherwise reserves all copyright rights whatsoever.

FIELD OF THE INVENTION

The present invention relates to computer system management. In particular, but not by way of limitation, the present invention relates to systems and methods for controlling pestware or malware.

BACKGROUND OF THE INVENTION

Personal computers and business computers are continually attacked by viruses, trojans, spyware, and adware, collectively referred to as "malware" or "pestware." These types of programs generally act to gather information about a person or organization—often without the person or organization's knowledge. Some pestware is highly malicious. Other pestware is non-malicious but may cause issues with privacy or system performance. And yet other pestware is actually beneficial or wanted by the user. Wanted pestware is sometimes not characterized as "pestware" or "spyware." But, unless specified otherwise, "pestware" or "malware" as used herein refers to any program that is malicious in some way and/or collects and/or reports information about a person or an organization and any "watcher processes" related to the pestware or malware.

Software is available to detect malware, but scanning files for malware often requires a system to look at files stored in a data storage medium (e.g., a disk drive) on a file by file basis. When the scanner is accessing data in a storage medium (e.g., a serially-accessed storage medium), however, the rate at which other processes (e.g., user applications) are able to access data from files stored on the storage medium is substantially reduced. In addition, anti-malware scanners add additional overhead (e.g., time and processing cycles) to every file that is saved by scanning the file while blocking the saving thread from doing additional work.

For example, if 100 files are copied onto a system with a typical anti-malware product installed, after each file has been copied, the scanner will block the thread that is writing the file from doing any more work until the scanner has scanned the file in question. And if scanning a file takes 100 ms on average, copying 100 files takes 10 seconds longer with the scanner installed than without it. Tests show that typical scanners, on average, add somewhere between 10% and 30% in time to saving a file, and for an individual file this can be as much as 2000%.

As a consequence, users are, at the very least, inconvenienced by the slow file access times. Accordingly, current software is not always able to scan and remove malware in a convenient manner and will most certainly not be satisfactory in the future.

SUMMARY OF THE INVENTION

Illustrative embodiments of the present invention that are shown in the drawings are summarized below. These and other embodiments are more fully described in the Detailed Description section. It is to be understood, however, that there is no intention to limit the invention to the forms described in this Summary of the Invention or in the Detailed Description. One skilled in the art can recognize that there are numerous modifications, equivalents, and alternative constructions that fall within the spirit and scope of the invention as expressed in the claims.

According to one embodiment, the invention may be characterized as a method for scanning files for malware that are saved to a storage medium. The method in this embodiment includes writing, via a communication pathway, a first file to the storage medium that is utilized by the computer; requesting access to the first file so as to enable the first file to be scanned for malware; delaying, when the first file resides on the storage medium, access to the first file while there is at least one I/O operation relative to the storage medium that has a higher priority level than a priority level of the request to access the first file; and preventing, except to enable the first file to be scanned for malware, access to the first file until the first file has been scanned for malware.

Another embodiment of the invention may be characterized as a system for scanning files for malware that are saved to a computer. The system in this embodiment includes an anti-malware component configured to scan files to detect malware; and a file system management component that delays the scanning component from accessing files stored on a storage medium while higher priority requests to access the storage medium are carried out, and an anti-malware filter driver component prevents applications from accessing the file until the file is scanned for malware.

Yet another embodiment of the invention may be characterized as a non-transitory, tangible computer readable storage medium, encoded with processor readable instructions to perform a method for scanning files that are saved to a computer. The encoded instructions in this embodiment enable writing, via a communication pathway, a first file to the storage medium that is utilized by the computer; requesting access to the first file so as to enable the first file to be scanned for malware; delaying, when the first file resides on the storage medium, access to the first file while there is at least one I/O operation relative to the storage medium that has a higher priority level than a priority level of the request to access the first file; and preventing, except to enable the first file to be scanned for malware, access to the first file until the first file has been scanned for malware.

BRIEF DESCRIPTION OF THE DRAWINGS

Various objects and advantages and a more complete understanding of the present invention are apparent and more readily appreciated by reference to the following Detailed Description and to the appended claims when taken in conjunction with the accompanying Drawings where like or similar elements are designated with identical reference numerals throughout the several views and wherein:

DETAILED DESCRIPTION

Figure 1:
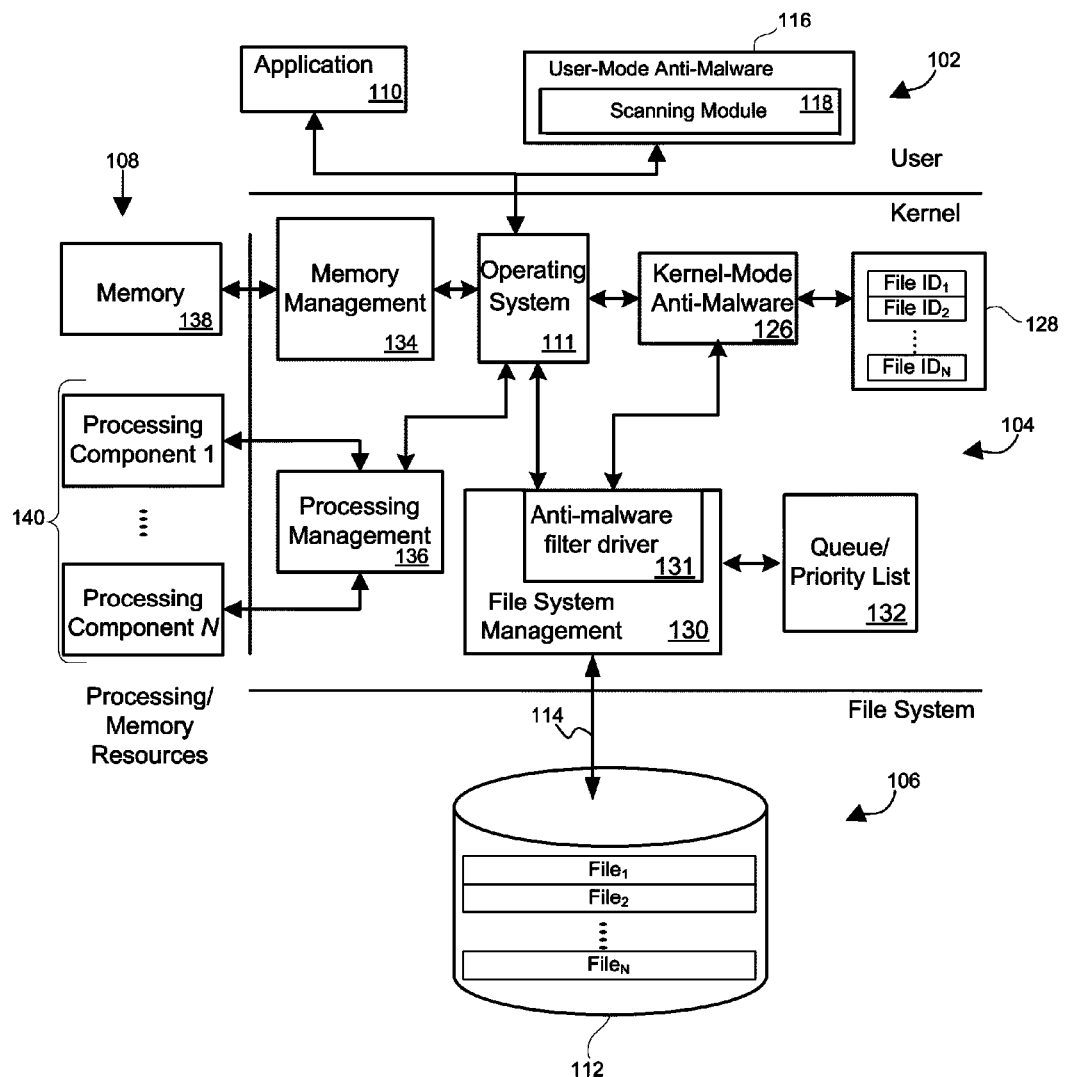
FIG. 1 illustrates a block diagram of a protected computer in accordance with one implementation of the present invention.

Referring first to FIG. 1, shown is a block diagram depicting a protected computer/system according to an exemplary embodiment. The term "protected computer" is used herein to refer to any type of computer system, including personal computers, handheld computers, servers, firewalls, etc. As depicted, the block diagram logically depicts a user-mode environment 102, a kernel environment 104, a file system 106, and processing/memory resources 108 of the protected computer.

As shown, operating within the user-mode environment 102 is an application 110, which may be any one of a variety of applications (e.g., word processing, spreadsheet, browser, etc.), and the application 110 communicates with an operating system 111 in the kernel environment 104, which in turn, provides (in connection with the file system management component 130) access to the file system 106 so as to enable files to be accessed, written, read, saved, and retrieved from a storage medium 112 via a communication pathway 114.

In several embodiments, the communication pathway 114 presents a restriction to the throughput of data that is communicated to/from the storage medium 112. Although not required, in some implementations the communication pathway 114 includes a substantially-serial communication pathway such as communication pathways utilized in connection with standard IDE/SATA drives and many, if not most, USB drives (e.g., "thumb drives" and external USB drives). In other implementations, the communication pathway 114 allows at least some parallel data communication to/from the storage medium 112 (e.g., PATA drives), but the communication pathway 114 still presents a limitation to the rate at which data may communicate between the user 102 and kernel 104 environments and the file system 106. Often for example, the level of data that threads running (in either user 102 and/or kernel mode 104) want to exchange with the storage medium 112 exceeds the level of throughput that the communication pathway 114 is capable of providing—regardless of whether the storage medium 112 is realized as a hard drive or a solid state drive. Thus, the communication pathway 114 generally presents a "bottle neck" to communications to (and from) the storage medium 112.

In addition, an anti-malware application 116 is depicted as operating in user-mode, and it includes a scanning module 118 that is configured to scan files to detect whether the files include indicia of malware. Although not depicted for simplicity, the scanning module 118 may include a sweep component that is responsible for accessing and retrieving information from the files located on the storage medium 112 and a detection component that detects malware or malware activity on the protected computer based upon the information received from the N files. Exemplary scanning/detection approaches are disclosed in U.S. patent application Ser. No. 11/462,956, filed Aug. 7, 2006, entitled SYSTEM AND METHOD FOR DEFINING AND DETECTING PEST-WARE and U.S. patent application Ser. No. 11/462,943, filed Aug. 7, 2006, entitled SYSTEM AND METHOD FOR DEFINING AND DETECTING PESTWARE WITH FUNCTION PARAMETERS, both of which are incorporated herein by reference.

Within the kernel environment 104 are shown a kernel-mode anti-malware component 126 and in communication with the anti-malware component 126 are the operating system 111 and a listing 128 of files that have not been scanned. And in communication with the operating system 111 is file system management component 130 that is in communication with a queue/priority list 132. As depicted, the file system management component 130 also includes an anti-malware filter driver 131, which as discussed in more detail further herein, generally operates to control access to files based upon information communicated by the kernel-mode anti-malware component 126. In addition, shown within the kernel environment 104 are memory management 134 and processing management 136 components.

Within the processing/memory resources component 108 are shown a memory portion 138, which logically represents one or more types of physical memory, and N processing components 140. The processing/memory resources portion 108 in the embodiment depicted in FIG. 1 represents hardware components that underlie and/or support the user 102, kernel 104, and file system 106 environments. And the memory management 134 and processing management 136 components generally control how the memory 138 and processing 140 resources, respectively, are allocated to support the user-mode environment 102, the kernel environment 104 and the file system 106.

As one of ordinary skill in the art will appreciate, the operating system 111 generally manages the interoperation of the depicted components of the protected computer. And the file system management component 130 generally controls access to the file system 106. For example, the file system management component 130 in connection with the queue/priority list 132 operates to control an order in which requests to access the file system 106 are carried out. More specifically, the queue/priority list 132 includes a queue of requests that is ordered based upon the relative priorities of each request, and the file system management component 130 (which may be realized by one or more file system driver(s) in addition to the anti-malware filter driver 131), functions to respond to the queued requests in the order of the requests in the queue 132. As discussed further herein, the kernel-mode malware component 126 or user-mode anti-malware component 116 assigns a scan-request a low priority so as to subordinate the scanning of a file to a lower priority level than other requests to access the file system 106. In the context of WINDOWS-based operating systems, details relative to one system for I/O prioritization are found in I/O Prioritization in Windows Vista, dated May 10, 2006, published by Microsoft Corporation, which is incorporated herein by reference.

In addition to controlling an order in which requests to access the file system 106 are carried out, the file system management component 130 (in connection with the kernel-mode anti-malware component 126) operates to control access to files based upon whether or not the files have been scanned for malware. More specifically, when a request is made (e.g., by the application 110 or another application) to access a file, the kernel-mode anti-malware 126 component informs the anti-malware filter driver 131 whether or not to prevent access to the file based upon whether an indicator for the file is in the list 128 of un-scanned files.

It should be recognized that the illustrated arrangement of these components is logical and not meant to be an actual hardware diagram. Thus, the components can be combined or further separated in an actual implementation, and may be connected in a variety of ways without changing the novel aspects of the protected computer described herein.

For example, the communication pathway 114 logically represents one or more communication pathways that are traversed when data is transferred to/from the storage medium 112, and when realized in physical embodiments, the communication pathway 114 may include portions of file system drivers, underlying disk drivers, a communication bus (to the storage medium 112) and/or one or more communication paths that are integrated within the storage medium 112.

As another example of the logical-nature of FIG. 1, the memory component 138, which is depicted as one of the processing/memory resources 108, represents potentially several types of separate or integrated memory components that may cache files, and store one or more portions of applications (e.g., the application 110 and the anti-malware application 116) operating in user mode 102 and one or more portions of the components depicted in the kernel environment 104 (including the operating system 111). In addition, the processing components 140 may be implemented separately or co-located within the same housing or even on the same substrate (and may be realized by multiple processors and/or multiple cores in each processor), but the processing components 140 enable true parallel, simultaneous processing (as opposed to time-multiplexed processing of multiple threads with a single processor or single core). And in alternative embodiments, instead of being distributed between the user-mode environment 102 and the kernel 104 environment, the anti-malware components 116, 126 may reside entirely in the kernel environment 104. In addition, one of ordinary skill in the art will appreciate that the operating system 111 may also have functions within the user mode 102 environment in addition to the kernel environment 104.

Typically, when an application (e.g., application 110) writes a file, until the file is closed, the write operation is not complete, and the file can not be executed. It can be accessed and data may be reread, but without exclusive access, it can not be executed, so the file is relatively harmless until it is closed.

As a consequence, many prior scanning systems were designed so that when the application that is writing the file requests that the file be closed, the file in these prior systems would either be analyzed before the file was closed, or alternatively, the file would be immediately scanned after the file was closed. In either case, these prior systems scanned the file without regard to other demands for I/O to/from the file system 106 and/or without regard to other thread's demands for processing resources 108. As a consequence, these prior art scanners compete with other applications for I/O access (e.g., access to the storage medium 112) or the processing resources 108; thus slowing down desirable operations of the computer. And in addition, the saving-thread (the thread saving the file), in these prior systems, is typically blocked from doing additional work until the file is scanned.

With respect to slowing access to the storage medium 112, if there are just a few write operations, the delay is insubstantial, but if a file is appended and closed frequently (e.g., once a second), a substantial delay may be incurred. And as previously discussed, if many files are copied onto the file system 106, in prior anti-malware systems, after each file has been copied, the scanner of the anti-malware system prevents the file-writing-thread from doing any more work until the scanner has scanned the file in question. And if scanning a file takes 100 ms on average, copying 100 files takes 10 seconds longer with the scanner installed than without it.

To address these problems, in many embodiments, when a file needs to be scanned (e.g., a file that has been written to the storage medium 112 for the first time or has been changed) the file is accessed (to enable scanning) with a low I/O priority so as not to interfere with more important I/O; thus the overhead and potential I/O demands associated with scanning a file for malware are moved in time so as to reduce or eliminate any competition with other applications demands/requests for access to the file system 106 and/or processing resources 108.

Applicant has found that the vast majority of files that have just been written to are not accessed again until "much" (e.g., at least a few seconds) later; thus even when the scanning of the file is delayed (e.g., so as not to interfere with other processes/threads/applications) it is rare that any other application (i.e., any application other than the scanning module 118) will attempt to access the file before it has been scanned. But access to the file will be prevented in the rare event a request is made (by an application other than the scanning module 118) to access the file. In addition, if the file is in cache memory of the memory resources 138, in many embodiments, the file is scanned, without regard to the priority of other requests to access the file system 106, using one of the N processing components 140 while other applications utilize one or more other processing components 140. In other words, if the file is in cache memory (of memory 138) the scanning module 118 does not need to utilize the communication pathway 114 to access the file; thus the file is scanned immediately and there is no adverse affect upon other application's needs for I/O processing resources.

So in the embodiment depicted in FIG. 1, when 100 files are copied, if files are in cache memory, the files can be scanned in parallel to the writing. And if the file system 106 is being utilized to store the copied files, the application that is writing the files will write all files until complete (without any intervening scanning of files on the storage device 112). As a consequence, from the perspective of the user, the write is complete. And typically, when writing the file, it is not immediately accessed, so the file may be scanned after the write operation without the user experiencing (e.g., perceptively noticing) the delays.

Figure 2:
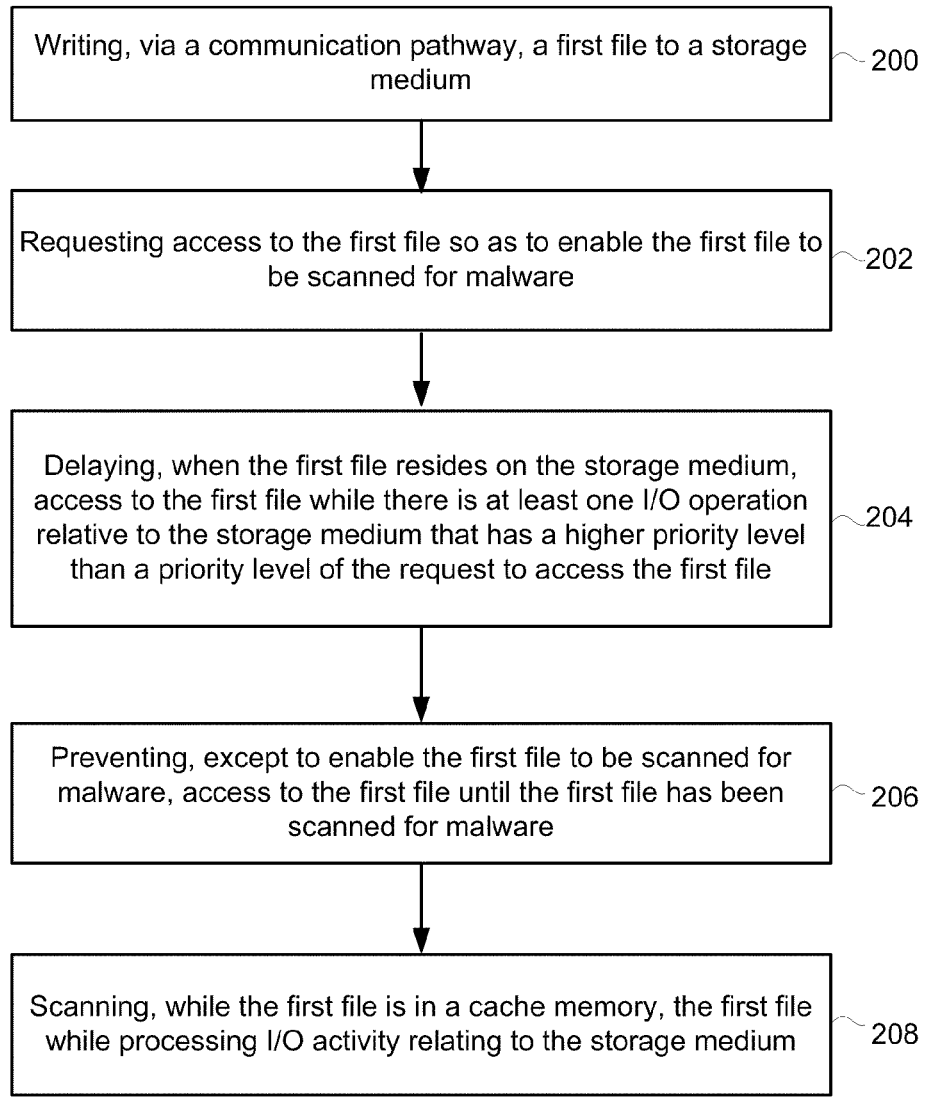
FIG. 2 is a flowchart of one method for managing access to a storage medium such as the storage medium depicted in FIG. 1.

For example, while referring to FIG. 1, simultaneous reference is made to FIG. 2, which is a flowchart depicting steps traversed when scanning files for malware in connection with many variations of the embodiment depicted in FIG. 1. As depicted, when a file is written to the storage medium 112 via the communication pathway 114 (Block 200), access is requested (e.g., by either the user mode 116 or kernel mode 126 anti-malware components) to the file so that the file may be scanned for malware (Block 202). Unlike prior scanning methodologies, many embodiments allow the file to be closed so that the application (e.g., application 110) that is writing the file may continue working so there is no delay from the application's 110 perspective.

Although the operating system 111 usually (but not always) initially caches the data in the memory component 138, at some point (either right away, seconds or several minutes later), the file is written (Block 200), using the file system 106, to the storage medium 112 (e.g., flash memory or hard disk).

As discussed further herein, when the file resides on the storage medium 112, the request to access the file (Block 202) is assigned a priority level which is intended to be lower than other I/O operations, so that from the user's perspective, performance of the protected computer is not substantially affected. In many implementations, for example, the priority assigned to the request to access the file is a lowest-possible priority, but in alternative embodiments, it is contemplated that a sufficiently low priority may be assigned to the request that is not the lowest possible priority.

In the exemplary embodiment depicted in FIG. 1, when the file is written (Block 200), the kernel-mode anti-malware component 126 places an identifier for the file in the list 128 (e.g., realized in memory 138) that is established for file-identifiers of files that have not yet been scanned, and the kernel-mode anti-malware component 126 notifies the user-mode anti-malware component 116 that the file needs to be scanned, which in turn, prompts the user-mode anti-malware component 116 to request access to the file so that the file may be scanned.

As depicted in FIG. 1, N file identifiers (corresponding to N files that need to be scanned) may be stored in the list 128 of un-scanned files, and if there is unabated I/O activity, it is possible that the list of un-scanned files may grow to include several file identifiers.

As shown, when the file resides on the storage medium 112, access to the file is delayed while there is at least one I/O operation that has a higher priority level than a priority level of the request to access the file for scanning. (Block 204). In the embodiment depicted in FIG. 1, a file system management component 130 in connection with a queue/priority list 132 manages access to the storage medium, and if there are other I/O operations in the queue/priority list 132 that have a higher priority than the priority level assigned to the request to access the file (for scanning), then the file system management component 130 delays access to the file while there is at least one I/O operation that has a higher priority level than a priority level of the request to access the file (Block 204).

And except to enable the file to be scanned for malware, access to the file is prevented until the file has been scanned for malware (Block 206). For example, if the application or another application wants to execute or read the file, the kernel-mode anti-malware component 126 is notified that a request to access the file has been made, and in response, the kernel-mode anti-malware component 126 checks the list 128 of un-scanned files, and if an identifier for the file is not in the list 128, the kernel-mode anti-malware component 126 allows the operating system to provide access to the file, or in alternative implementations, the kernel-mode anti-malware component 126 directly accesses the file (e.g., without using the operating system).

But if the identifier for the file is in the list 128, the kernel-mode anti-malware component 126 communicates information to the anti-malware filter driver 131, which prompts the anti-malware filter driver 131 to block access to the file (e.g., to prevent execution or reading of the file) until it is determined (e.g., by the user mode anti-malware component 116 and/or kernel-mode anti-malware component 104) whether the file is malware (or is suspected of being malware). If it is malware (or suspected of being malware), the anti-malware filter driver 131 continues to deny access to the file, and if the file is not malware, control is handed over to the operating system to allow the file to be accessed and the identifier for the file is removed from the list 128 of un-scanned files.

More particularly, in the exemplary embodiment depicted in FIG. 1, if a thread (in either the user mode environment 102 or the kernel mode environment 104) wants to access a file that has not been scanned, the thread may issue a "CreateFile" command, which will go to the operating system (OS) in kernel mode 104. The OS in turn, performs a few parameter validation checks, and assuming the call is passed forward to an I/O sub system, the I/O subsystem passes the call to a chain of filters (e.g., registered filter drivers). In many implementations, the anti-malware filter driver 131 is a part of the chain of filters so as to enable the kernel-mode anti-malware component 126 (by controlling the anti-malware filter driver 131) to remain in control of whether a file that has not been scanned is accessed. Assuming access is not denied by any of the filters, the I/O subsystem then allows the file system 106 execute the request.

Then, upon receiving the result from the file system 106, the I/O sub system gives the filter drivers a second chance to deal with the results of the call outcome. Often it isn't until this point where enough information is available to make an informed decision about whether access to the file is granted. So, it is either on the initial downward request path or the upward path where the call may be held off for a while or simply denied. In many embodiments, the request to access the file is delayed until it is scanned, and pending the outcome of the scan, the call is allowed to go on or it may be denied (e.g., if the file includes indicia of malware).

As discussed, Applicant has found that in the vast majority of instances, files that are written to a storage medium (e.g., the storage medium 112) are not accessed again until after a sufficiently-long time period (e.g., seconds), which enables the file to be accessed and scanned when there are no higher-level priority I/O operations taking place. As a consequence, the file is accessed (for scanning) with a low I/O priority so as not to interfere with more important I/O, and the file will, in the majority of instances, be scanned before the user or another process attempts to access the file (even after waiting for higher-priority I/O operations to be carried out).

So delays are still present, but are moved from the closing of the file (as in prior systems) to the access point. If no time passes between the closing of the file and execution of the file, there is still a delay because there has been no chance to check the file. But if scanning the file for malware only takes 100 ms, then if at least 100 ms go by between the time when the file is allowed to close and the time a request is made to access the file, the user does not experience a perceived delay.

And in many embodiments, if the file resides in a cache memory of the memory component 138 (as apposed to the storage medium 112), the file is scanned for indicia of malware while I/O activity relating to the storage medium 112 is processed (Block 208). Beneficially, the embodiment depicted in FIG. 1 includes multiple processing components 140 so that a file may be scanned (e.g., by one processing component in connection with the user mode or kernel mode anti-malware components 116, 126) while a file is written and/or processed using another processing component. In other words, scanning and file writing can be done in parallel—while a write operation is taking place, a scan can also be carried out, and the processing management component 136 allocates threads to the processing components (e.g., cores) to enable true parallel processing.

Figure 3:
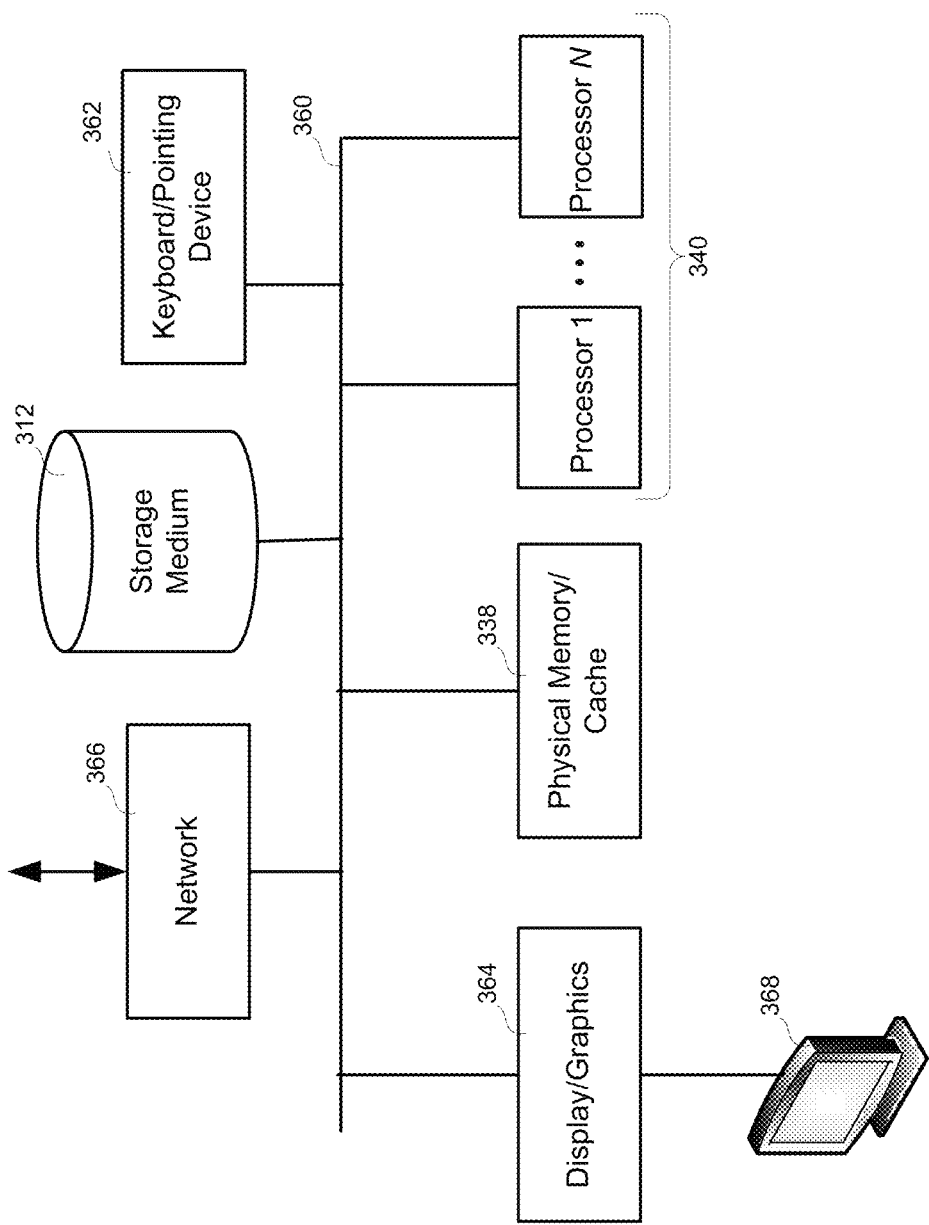
FIG. 3 is a block diagram depicting an exemplary components that may underlie the protected computer described with reference to FIG. 1.

Referring next to FIG. 3, shown is a block diagram depicting hardware components in an exemplary embodiment of the protected computer described with reference to FIG. 1. As shown, the N processing components 140 described with reference to FIG. 1 are depicted as N processors 340 that are coupled to a bus 360, and also coupled to the bus 360 are a memory 338 (corresponding to memory 138), storage medium 312 (corresponding to the storage medium 112), a keyboard/pointing device 362, a display/graphics adapter 364, and a network interface 366. In addition, a display 368 is coupled to the display/graphics adapter 364.

The storage medium 312 may be any device capable of holding substantial amounts of data, such as a hard drive, flash memory, or some other form of fixed or removable storage device. And the storage medium 312 in this embodiment stores processor-readable code with instructions to effectuate the functions described herein (e.g., the functions of the components in FIG. 1 depicted in the user 102 and kernel 104 environments). The processors 340 generally function to execute code and process other information that resides in memory and may be any specific or general-purpose processor such as an INTEL x86 or POWERPC-compatible central processing unit (CPU), and each may include one or multiple (e.g., four) cores. The memory 338 may include several gigabytes of random access memory, but this is merely exemplary and other memory types and sizes may be utilized. As one of ordinarily skill will appreciate, an operating system (e.g., LINUX or WINDOWS) may also reside in the storage medium 312 and memory 338 and function (e.g., when executed by one or more of the processors 340) to enable the components to operate as described with reference to FIG. 1.

As one of ordinary skill in the art in light of this disclosure will appreciate, FIG. 3 depicts only an exemplary embodiment, and the processes presented herein are not inherently related to any particular computing device or other apparatus. Various general purpose systems may be used with programs in accordance with the teachings herein, or it may prove convenient to construct a more specialized apparatus to perform the desired method. In addition, embodiments of the present invention are not described with reference to any particular programming language. It will be appreciated that a variety of programming languages may be used to implement the teachings of the invention as described herein. In addition, it should be understood that operations, capabilities, and features described herein may be implemented with any combination embodied in firmware, software, application-specific integrated circuits (ASICs), and/or programmable logic devices.

In conclusion, embodiments of the present invention enable the scanning of files for malware without interfering with other, higher or simply normal priority I/O on the system. In addition, many implementations of the present invention enable files to be scanned for malware in parallel with other processing and I/O activities. Those skilled in the art can readily recognize that numerous variations and substitutions may be made in the invention, its use and its configuration to achieve substantially the same results as achieved by the embodiments described herein. Accordingly, there is no intention to limit the invention to the disclosed exemplary forms. Many variations, modifications and alternative constructions fall within the scope and spirit of the disclosed invention as expressed in the claims.

What is claimed is:

1. A method for scanning files for malware, comprising:
   requesting access to a first file so as to enable the first file to be scanned for malware;
   determining if the first file to be scanned for malware resides in a cache memory;
   scanning, when the first file resides in the cache memory, the first file for malware while processing Input/Output (I/O) activity relating to a storage medium;
   delaying, when the first file does not reside in the cache memory, scanning of the first file for malware while there is at least one I/O operation directed to the storage medium that has a higher priority level than a priority level of the request to access the first file; and
   preventing, except to enable the first file to be scanned for malware, access to the first file until the first file has been scanned for malware, wherein preventing access to the first file comprises delaying access to the first file until the first file is scanned for malware.

2. The method of claim 1, further comprising:
   storing an identifier that uniquely identifies the first file so as to identify the first file as a file that has not been scanned.

3. The method of claim 1, further comprising scanning the first file using a first processing portion of a computer and using a second processing portion of the computer to process the I/O activity relating to the storage medium.

4. The method of claim 1, wherein the I/O activity relating to the storage medium comprises a write operation and wherein the scanning the file for malware and the write operation are performed in parallel.

5. The method of claim 1, wherein the cache memory is memory separate from a processing component.

6. A system for scanning files for malware, comprising:
   an anti-malware component configured to request access to files to enable the files to be scanned for malware;
   a file system management component that determines if the files to be scanned for malware reside in a cache memory, scans, when the files reside in the cache memory, the files for malware while higher priority requests to access a storage medium are carried out, and delays, when the files reside in the cache memory, the anti-malware component from accessing the files while the higher priority requests to access the storage medium are carried out; and
   an anti-malware filter driver component in communication with the anti-malware component, the anti-malware filter driver component preventing applications from accessing the files until the files are scanned for malware, wherein preventing applications from accessing the files comprises delaying access to the files until the files are scanned for malware.

7. The system of claim 6, wherein the anti-malware component operates in user mode.

8. The system of claim 6, wherein the anti-malware component operates in kernel mode.

9. The system of claim 6, wherein the anti-malware component operates in both user mode and kernel mode.

10. The system of claim 6, wherein the anti-malware component is configured to store identifiers that uniquely identify files that have not been scanned.

11. The system of claim 6, wherein the anti-malware filter driver is one driver in a collection of filter drivers in the file system management component, the collection of filter drivers collectively forming a chain of filter drivers that control access to the storage medium.

12. The system of claim 6, wherein the I/O activity relating to the storage medium comprises a write operation and wherein the scanning the file for malware and the write operation are performed in parallel.

13. The system of claim 6, wherein the cache memory is memory separate from a processing component.

14. A non-transitory computer-readable storage medium, encoded with processor readable instructions to perform a method for scanning files for malware, the method comprising:
   requesting access to a first file so as to enable the first file to be scanned for malware;
   determining if the first file to be scanned for malware resides in a cache memory;
   scanning, when the first file resides in the cache memory, the first file for malware while processing Input/Output (I/O) activity relating to a storage medium;
   delaying, when the first file does not reside in the cache memory, scanning of the first file for malware while there is at least one I/O operation directed to the storage medium that has a higher priority level than a priority level of the request to access the first file; and
   preventing, except to enable the first file to be scanned for malware, access to the first file until the first file has been scanned for malware, wherein preventing applications from accessing the files comprises delaying access to the files until the files are scanned for malware.

15. The non-transitory computer-readable storage medium of claim 14, encoded with processor readable instructions to perform a method for scanning files for malware, the method further comprising:
   storing an identifier that uniquely identifies the first file so as to identify the first file as a file that has not been scanned.

16. The non-transitory computer-readable storage medium of claim 14, encoded with processor readable instructions to perform a method for scanning files for malware, the method further comprising:
  scanning the first file using a first processing portion of a computer and using a second processing portion of the computer to process the I/O activity relating to the storage medium.

17. The non-transitory computer-readable storage medium of claim 14, encoded with processor readable instructions to perform a method for scanning files for malware, wherein the I/O activity relating to the storage medium comprises a write operation and wherein the scanning the file for malware and the write operation are performed in parallel.

18. The non-transitory computer-readable storage medium of claim 14, encoded with processor readable instructions to perform a method for scanning files for malware, wherein the cache memory is memory separate from a processing component.

* * * * *